(12) United States Patent
Krahn et al.

(10) Patent No.: US 8,980,053 B2
(45) Date of Patent: Mar. 17, 2015

(54) TRANSFORMER PAPER AND OTHER NON-CONDUCTIVE TRANSFORMER COMPONENTS

(71) Applicants: John R. Krahn, Schenectady, NY (US); Erich Otto Teutsch, Richmond, MA (US)

(72) Inventors: John R. Krahn, Schenectady, NY (US); Erich Otto Teutsch, Richmond, MA (US)

(73) Assignee: Sabic Innovative Plastics IP B.V. (NL)

(*) Notice: Subject to any disclaimer, the term of this patent is extended or adjusted under 35 U.S.C. 154(b) by 0 days.

(21) Appl. No.: 13/827,910

(22) Filed: Mar. 14, 2013

(65) Prior Publication Data

US 2013/0255899 A1 Oct. 3, 2013

Related U.S. Application Data

(60) Provisional application No. 61/618,061, filed on Mar. 30, 2012.

(51) Int. Cl.
*D21H 11/00* (2006.01)

(52) U.S. Cl.
USPC ................................................. 162/141

(58) Field of Classification Search
USPC ............... 162/141, 146, 158; 252/62; 429/26
See application file for complete search history.

(56) References Cited

U.S. PATENT DOCUMENTS

| | | |
|---|---|---|
| 3,620,907 A | 11/1971 | Yuan |
| 3,803,085 A | 4/1974 | Takehoshi et al. |
| 3,847,867 A | 11/1974 | Heath et al. |
| 3,852,242 A | 12/1974 | White |
| 3,905,942 A | 9/1975 | Takekoshi et al. |
| 3,914,501 A | 10/1975 | Miller et al. |
| 3,983,093 A | 9/1976 | Williams, III et al. |
| 4,118,535 A | 10/1978 | Banucci et al. |
| 4,163,030 A | 7/1979 | Banucci et al. |
| 4,394,417 A | 7/1983 | Hilker |
| 4,443,591 A | 4/1984 | Schmidt et al. |
| 5,227,109 A | 7/1993 | Allen, III et al. |
| 5,250,756 A | 10/1993 | Swift et al. |
| 5,308,927 A | 5/1994 | Hosoi |
| 5,357,033 A | 10/1994 | Bendler et al. |
| 5,358,786 A | 10/1994 | Ishikawa et al. |
| 5,458,972 A | 10/1995 | Hagen |
| 5,476,695 A | 12/1995 | Okada et al. |
| 5,504,469 A | 4/1996 | McGrane |
| 5,514,748 A | 5/1996 | Isutsumi et al. |
| 5,670,001 A | 9/1997 | Huebner et al. |
| 5,720,264 A | 2/1998 | Oosuka et al. |
| 5,723,920 A | 3/1998 | Markovitz et al. |
| 5,729,423 A | 3/1998 | Donde et al. |

(Continued)

FOREIGN PATENT DOCUMENTS

| | | |
|---|---|---|
| EP | 0063963 A1 | 11/1982 |
| EP | 0217563 A2 | 4/1987 |

(Continued)

OTHER PUBLICATIONS

Nomex Type 410; Technical Data Sheet; 8 pages.

(Continued)

*Primary Examiner* — Mark Halpern
(74) *Attorney, Agent, or Firm* — Cantor Colburn LLP; Diderico van Eyl (57) ABSTRACT

A transformer paper comprising polyetherimide fibers is disclosed, along with a method of making the transformer paper and articles.

18 Claims, 3 Drawing Sheets

(56) References Cited

U.S. PATENT DOCUMENTS

| | | |
|---|---|---|
| 5,904,954 A | 5/1999 | Cassat et al. |
| 5,981,007 A | 11/1999 | Rubin et al. |
| 6,001,957 A | 12/1999 | Puyenbroek et al. |
| 6,066,806 A | 5/2000 | Higashiura et al. |
| 6,191,675 B1 | 2/2001 | Sudo et al. |
| 6,280,843 B1 | 8/2001 | Murayama et al. |
| 6,288,342 B1 | 9/2001 | Ueoka et al. |
| 6,296,935 B1 | 10/2001 | Higashiura et al. |
| 6,329,055 B1 | 12/2001 | Higashiura et al. |
| 6,586,791 B1 | 7/2003 | Lee et al. |
| 6,980,076 B1 | 12/2005 | Rolling et al. |
| 7,026,033 B2 | 4/2006 | Fujimori et al. |
| 7,041,773 B2 | 5/2006 | Gallucci et al. |
| 7,084,349 B1 | 8/2006 | Bates et al. |
| 7,767,059 B2 | 8/2010 | Ryan et al. |
| 2001/0018981 A1 | 9/2001 | Yin et al. |
| 2002/0104606 A1 | 8/2002 | Ohzuru et al. |
| 2003/0079732 A1 | 5/2003 | Simonds |
| 2003/0181560 A1 | 9/2003 | Kawaguchi et al. |
| 2003/0236044 A1 | 12/2003 | Nissim et al. |
| 2004/0070480 A1 | 4/2004 | Nakashima et al. |
| 2004/0105991 A1 | 6/2004 | Ishii et al. |
| 2005/0083160 A1 | 4/2005 | Gao et al. |
| 2005/0142349 A1 | 6/2005 | Irwin et al. |
| 2006/0194051 A1 | 8/2006 | Fukuda et al. |
| 2006/0267459 A1 | 11/2006 | Shelby |
| 2007/0108490 A1 | 5/2007 | Tan et al. |
| 2007/0116976 A1 | 5/2007 | Tan et al. |
| 2007/0117886 A1 | 5/2007 | Tan et al. |
| 2007/0129481 A1 | 6/2007 | Yamaguchi et al. |
| 2007/0148467 A1 | 6/2007 | St. Lawrence et al. |
| 2008/0012170 A1 | 1/2008 | Lak et al. |
| 2008/0050589 A1 | 2/2008 | Tsushima et al. |
| 2008/0105395 A1 | 5/2008 | Shiratori et al. |
| 2008/0187759 A1 | 8/2008 | Fukuda et al. |
| 2009/0202806 A1 | 8/2009 | Ebina et al. |
| 2009/0278252 A1 | 11/2009 | Oikawa et al. |
| 2010/0079926 A1 | 4/2010 | Tan et al. |
| 2010/0108140 A1 | 5/2010 | Auman et al. |
| 2010/0132975 A1 | 6/2010 | Shimizu et al. |
| 2010/0302707 A1 | 12/2010 | Tan et al. |
| 2010/0303520 A1 | 12/2010 | Miyauchi et al. |
| 2010/0319961 A1 | 12/2010 | Honda et al. |
| 2012/0015184 A1 | 1/2012 | Endo et al. |
| 2012/0065283 A1 | 3/2012 | Adjei et al. |
| 2013/0260088 A1 | 10/2013 | David et al. |
| 2013/0260123 A1 | 10/2013 | Krahn et al. |
| 2013/0260124 A1 | 10/2013 | David et al. |

FOREIGN PATENT DOCUMENTS

| | | |
|---|---|---|
| EP | 0177575 | 7/1989 |
| EP | 0383953 A1 | 8/1990 |
| EP | 0407781 A2 | 1/1991 |
| EP | 0962559 S2 | 12/1999 |
| EP | 0994215 A1 | 4/2000 |
| EP | 1243696 A2 | 9/2002 |
| GB | 1480631 | 7/1977 |
| JP | 2005028593 A | 2/2005 |
| WO | 8504532 A1 | 10/1985 |
| WO | 8900761 A1 | 1/1989 |
| WO | 9102042 | 2/1991 |
| WO | 9218213 A1 | 10/1992 |
| WO | 9611293 A1 | 4/1996 |
| WO | 9716829 A1 | 5/1997 |
| WO | 0220698 A1 | 3/2002 |
| WO | 2012037225 A2 | 3/2012 |
| WO | 2012093048 A1 | 7/2012 |
| WO | 2013148989 A1 | 10/2013 |
| WO | 2013149104 A1 | 10/2013 |
| WO | 2013149105 A1 | 10/2013 |

OTHER PUBLICATIONS

JP 2004241647; Date of Publication Aug. 26, 2004; 11 pages; English Abstract.

International Search Report for International Application No. PCT/US2013/034331; International Filing Date Mar. 28, 2013; Date of Mailing Jun. 27, 2013; 5 pages.

Written Opinion of the International Search Report for International Application No. PCT/US2013/034331; International Filing Date Mar. 28, 2013; Date of Mailing Jun. 27, 2013; 5 pages.

International Search Report for International Application No. PCT/US2013/034332; International Date of Filing Mar. 28, 2013; Date of Mailing Jun. 28, 2013; 5 pages.

Written Opinion of the International Search Report for International Application No. PCT/US2013/034332; International Date of Filing Mar. 28, 2013; Date of Mailing Jun. 28, 2013; 4 pages.

International Search Report for International Application No. PCT/US2013/034526; International Date of Filing Mar. 29, 2013; Date of Mailing Jun. 27, 2013; 5 pages.

Written Opinion of the International Search Report for International Application No. PCT/US2013/034526; International Date of Filing Mar. 29, 2013; Date of Mailing Jun. 27, 2013; 5 pages.

International Search Report for International Application No. PCT/US2013/034527; International Date of Filing Mar. 29, 2013; Date of Mailing Jun. 28, 2013; 5 pages.

Written Opinion of the International Search Report for International Application No. PCT/US2013/034527; International Date of Filing Mar. 29, 2013; Date of Mailing Jun. 28, 2013; 4 pages.

Frost et al.; "Investigation into the Effect of Transformer Oil on Polymers"; IEEE Transactions on Power Delilvery; vol. 11; No. 1; Jan. 1996; pp. 331-334.

U.S. Appl. No. 13/723,533; filed with USPTO on Dec. 21, 2012.

Machine Translation of JP2005028593 A; Date of Publication Feb. 3, 2005; 27 pages.

Leung et al.; "Applications of multifunctional polymer-matrix composites in hybrid heat sinks"; 2012; Behavior and Mechanics of Multifunctional Materials and Composites; vol. 8342; 9 pages.

JP 2011127252 with English Abstract; Date of Publication: Jun. 30, 2011; 16 pages.

International Search Report for International Application PCT/US2013/076359; International Filing Date: Dec. 19, 2013; Date of Mailing: Jun. 25, 6014; 5 pages.

Written Opinion of thhe International Search Report for International Application PCT/US2013/076359; International Filing Date: Dec. 19, 2013; Date of Mailing: Jun. 25, 6014; 11 pages.

US 5,030,305, 07/1991, Fell (withdrawn)

TRANSFORMER PAPER AND OTHER NON-CONDUCTIVE TRANSFORMER COMPONENTS

CROSS-REFERENCE TO RELATED APPLICATION

This application claims the benefit of U.S. Provisional Patent Application Ser. No. 61/618,061 filed Mar. 30, 2012. The related application is incorporated herein by reference.

BACKGROUND

This disclosure relates to transformer paper and other non-conductive transformer components. Electrical devices and components often employ paper insulation to surround and electrically insulate an electrical conductor. One such electrical device is a transformer that has at least two electric circuits that share a common magnetic flux, so that a voltage in one circuit magnetically induces a voltage in the other circuit. In addition, a magnetic path can be provided by an iron core. The electric circuits and the core can be immersed in a dielectric fluid in an enclosure. These dielectric fluids are also referred to as transformer oils and transformers containing them are referred to as oil-filled transformers. The conductors that make up the electric circuits are separated and electrically insulated from each other and from other components, such as the core and the enclosure, by paper insulation.

Non-conductive components in oil-filled transformers (spacers, oil ducts, paper (both porous and non-porous, as well as creped), board, plastic bolts, ropes, etc.) have often been made from cellulosic and other hydrophilic materials (i.e. paper, pressboard, wood, cotton, nylon, etc.). These materials have disadvantages in that they degrade when exposed to high temperatures and introduce water into the oil-filled transformer as a by-product of their decomposition. Water contamination of the oil-filled transformer is highly undesirable since it degrades the performance of the transformer through electrical discharge activity and lossiness, causes further degradation of non-conductive components, and, ultimately, electrical failure of the transformer.

In addition to their negative effect on service life, cellulosic and other hydrophilic materials force delays in the production cycle time for oil-filled transformers. Due to the tendency of cellulosic and other hydrophilic materials to retain moisture, these non-conductive transformer components undergo a prolonged drying process before assembly into an oil-filled transformer. It has also been observed that the drying process can result in embrittlement of these components, which can also cause reduced service life of the transformer.

U.S. Pat. No. 6,980,076 relates to improved cellulosic insulation papers which contain synthetic reinforcing fibers intended to extend the usefulness of cellulosic papers as they degrade during their service life by providing a reinforcing web. However, this improved cellulosic paper still releases water as it ages causing water degradation of oil-filled transformers and the art still has an unmet need for improved electrical insulation paper.

It would therefore be desirable to replace the cellulosic and hydrophilic non-conductive structures with comparable structures that do not share this disadvantage. Doing so could afford a transformer that would run at higher temperatures, higher energy density, and for longer life—all of which will be necessary for updating the electric grid and mitigating the impact of electric vehicles on distribution and power transformers. Furthermore, such transformers could be faster and easier to manufacture and result in faster, lower cost repairs, as well.

SUMMARY

Disclosed herein is transformer paper comprising a consolidated product of a fiber composition, the fiber composition comprising, based on the total weight of fibers in the fiber composition 35 to 70 weight % of polyetherimide homopolymer fibers, polyetherimide copolymer fibers or a combination comprising at least one of the foregoing fibers; at least 5 weight % of binder comprising aromatic polyamide fibrids, aromatic polyamide fibers, or a combination comprising at least one of the foregoing; and 5 to 30 weight % of liquid crystal polymer fiber, wherein: the binder contains less than 10 weight % of a polycarbonate; the polyimide retains at least 90% of its molecular weight upon exposure to silicone, vegetable or mineral oil at an elevated temperature below the Tg of the polyimide; and wherein the consolidated product has
 1) a resistivity of at least 1000 MOhm-cm;
 2) an electrical breakdown strength of at least 600 Volt/mil;
 3) a thermal capability exceeding the standards for NEMA Class F (155° C.) and NEMA Class H (180° C.);
 4) less than or equal to 5 weight % gain due to water saturation at 100% Relative Humidity;
 5) a tear strength, measured as Elmendorf tear strength of at least 85 mN, as determined according to TAPPI-414 om-04; and
 6) a thickness of more than 0 to less than 100 millimeters.

Also disclosed herein is a method of forming a transformer paper by forming a layer from a slurry comprising a suspension solvent; and a fiber composition comprising a combination of 35 to 70 wt. % of polyetherimide fibers; at least 5 wt. % of aromatic polyamide fibers; and 5 to 30 wt. % of liquid crystal polymer fibers, wherein the wt. % of the fibers is based on the total weight of the fibers in the fiber composition; dewatering the layer; and consolidating the layer to form the fibrous substrate.

Also disclosed is a transformer component comprising the transformer paper in the form of porous paper, nonporous paper, crepe paper, stick paper, spacers, pressboard, and rigid structures.

Also disclosed is a transformer which contains a component comprising the transformer paper.

The above described and other features are exemplified by the following figures and detailed description.

DETAILED DESCRIPTION

The present inventors have discovered that these disadvantages of oil-filled transformers containing non-conductive components made from cellulosic materials can be overcome by providing non-conductive components for oil-filled transformers consisting of polyetherimide and reinforcing fibers.

The fibrous substrates can be used to produce various types of paper for use in transformers, such as porous paper, nonporous paper, pressboard, spacers and stick paper, which all need to have wet tear strength comparable to transformer papers. Porous paper: Some papers used to wrap turn groups needs to be porous to allow oil impregnation and removal of all bubbles. Trapped air is highly undesirable. Non-Porous paper: Some papers used to wrap turn groups and leads do not need to be porous. Traditional film would suffice, but generally lacks sufficient tear strength of paper. The paper needs to have wet tear strength comparable to transformer papers. Pressboard and spacers: Such structures need to afford physical stand-off isolation of electrical conductors. Traditionally, these materials are somewhat porous so as to eliminate any bubbles or voids. It could be replaced by a solid structure, but that structure would have to be void free. Stick paper is used to make oil ducts in smaller transformers. The sticks can be made from solid polyetherimide and, depending upon the transformer design, the paper backing could be film or porous paper (if needed).

The fiber composition can contain 35 to 70 wt. % of polyetherimide homopolymer fiber, polyetherimide copolymer fiber, or a combination of the foregoing, for example 40 to 70 wt. %, 50 to 70 wt. %, 40 to 65 wt. %, 45 to 65 wt. %, 50 to 65 wt. %, 50 to 70 wt. %, 60 to 70 wt. % or 65 to 70 wt. % of polyetherimide homopolymer fiber, polyetherimide copolymer fiber, or a combination of the foregoing.

The fiber composition can contain at least 5 wt. % of aromatic polyamide fibrids, aromatic polyamide fibers, or a combination comprising at least one of the foregoing, for example 5 to 30 wt. %, 5 to 25 wt. %, 5 to 20 wt. %, 5 to 15 wt. %, 5 to 10 wt. %, 10 to 30 wt. %, 10 to 25 wt. %, 10 to 20 wt. %, or 10 to 15 wt. % aromatic polyamide fibrids, aromatic polyamide fibers, or a combination comprising at least one of the foregoing.

The fiber composition can contain 5 to 30 wt. % of liquid crystal polymer fibers, for example 5 to 25 wt. %, 5 to 20 wt. %, 5 to 15 wt. %, 5 to 10 wt. %, 10 to 30 wt. %, 10 to 25 wt. %, 10 to 20 wt. %, 10 to 15 wt. %, 15 to 30 wt. %, 15 to 25 wt. %, 15 to 20 wt. %, 20 to 30 wt. %, 25 to 30 wt. % of liquid crystal polymer fibers.

Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

The terms "a" and "an" do not denote a limitation of quantity, but rather denote the presence of at least one of the referenced items. As used herein, "combination thereof" is inclusive of one or more of the recited elements, optionally together with a like element not recited. Reference throughout the specification to "an embodiment," "another embodiment," "some embodiments," and so forth, means that a particular element (e.g., feature, structure, property, and/or characteristic) described in connection with the embodiment is included in at least an embodiment described herein, and may or may not be present in other embodiments. In addition, it is to be understood that the described element(s) can be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "alkyl" includes both $C_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" means an aromatic moiety containing the specified number of carbon atoms and optionally 1 to 3 heteroatoms (e.g., O, S, P, N, or Si), such as to phenyl, tropone, indanyl, or naphthyl.

All molecular weights in this application refer to weight average molecular weights unless indicated otherwise. All such mentioned molecular weights are expressed in Daltons.

All ASTM tests are based on the 2003 edition of the Annual Book of ASTM Standards unless otherwise indicated.

The term "fibers" as used herein includes a wide variety of structures having a single filament with an aspect ratio (length:diameter) of greater than 2, specifically greater than 5, greater than 10, or greater than 100. The term fibers also includes fibrets (very short (length less than 1 mm), fine (diameter less than 50 µm) fibrillated fibers that are highly branched and irregular resulting in high surface area), and fibrils, tiny threadlike elements of a fiber. The diameter of a fiber is indicated by its fiber number, which is generally reported as either dtex or dpf. The numerical value reported as "dtex" indicates the mass in grams per 10,000 meters of the fiber. The numerical value "dpf" represents the denier per fiber. The denier system of measurement is used on two and single filament fibers, and dpf=Total Denier/Quantity of Uniform Filaments. Some common denier-related calculations are as follows:

1 denier=1 gram per 9,000 meters=0.05 grams per 450 meters=0.111 milligrams per meter.

In practice measuring 9,000 meters is cumbersome and usually a sample of 900 meters is weighed and the result multiplied by 10 to obtain the denier weight.

The term "fibrids", as used herein, means very small, non-granular, fibrous or film-like particles with at least one of their three dimensions being of minor magnitude relative to the largest dimension, such that they are essentially two-dimensional particles, typically having a length greater than 0 to less than 0.3 mm, and a width of greater than 0 to less than 0.3 mm and a depth of greater than 0 to less than 0.1 mm In an exemplary embodiment the fibrids are on the order of 100 µm×100 µm×0.1 µm.

Fibrids are typically made by streaming a polymer solution into a coagulating bath of liquid that is immiscible with the solvent of the solution. The stream of polymer solution is subjected to strenuous shearing forces and turbulence as the polymer is coagulated. The fibrid material of this invention can be meta or para-aramid or blends thereof. More specifically, the fibrid is a para-aramid. Such aramid fibrids, before being dried, can be used wet and can be deposited as a binder physically entwined about the floc component of a paper.

Polyetherimides comprise more than 1, for example 10 to 1,000 or 10 to 500 structural units, of formula (1)

wherein each R is the same or different, and is a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of formula (2)

(2)

wherein $Q^1$ is —O—, —S—, —C(O)—, —SO$_2$—, —SO—, or —C$_y$H$_{2y}$— wherein y is an integer from 1 to 5 or a halogenated derivative thereof (which includes perfluoroalkylene groups). In an embodiment, R is m-phenylene or p-phenylene.

Further in formula (1), T is —O— or a group of the formula —O—Z—O— wherein the divalent bonds of the —O— or the —O—Z—O— group are in the 3,3', 3,4', 4,3', or the 4,4' positions. The group Z in formula (1) is the same or different, and is also a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded. Exemplary groups Z include groups derived from a dihydroxy compound of formula (3):

(3)

wherein $R^a$ and $R^b$ can be the same or different and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formulas (3a)

(3a)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment, Z is derived from bisphenol A wherein Q in formula (3a) is 2,2-isopropylidene.

In an embodiment in formula (1), R is m-phenylene or p-phenylene and T is —O—Z—O wherein Z is a divalent group of formula (3a). Alternatively, R is m-phenylene or p-phenylene and T is —O—Z—O wherein Z is a divalent group of formula (3a) and Q is 2,2-isopropylidene.

In some embodiments, the polyetherimide can be a copolymer, for example, a polyetherimide sulfone copolymer comprising structural units of formula (1) wherein at least 50 mole % of the R groups are of formula (2) wherein $Q^1$ is —SO$_2$— and the remaining R groups are independently p-phenylene or m-phenylene, or a combination comprising at least one of the foregoing; and Z is 2,2-(4-phenylene)isopropylidene. Alternatively, the polyetherimide optionally comprises additional structural imide units, for example imide units of formula (4)

(4)

wherein R is as described in formula (1) and W is a linker of the formulas

These additional structural imide units can be present in amounts of 0 to 10 mole % of the total number of units, specifically 0 to 5 mole %, more specifically 0 to 2 mole %. In an embodiment, no additional imide units are present in the polyetherimide.

The polyetherimide can be prepared by any of the methods well known to those skilled in the art, including the reaction of an aromatic bis(ether anhydride) of formula (5)

with an organic diamine of formula (6)

$$H_2N—R—NH_2 \qquad (6)$$

wherein T and R are defined as described above. Copolymers of the polyetherimides can be manufactured using a combination of an aromatic bis(ether anhydride) of formula (5) and a different bis(anhydride), for example a bis(anhydride) wherein T does not contain an ether functionality, for example T is a sulfone.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, as well as combinations comprising at least one of the foregoing dianhydrides.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl)amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(p-amino-t-butyl)toluene, bis(p-amino-t-butylphenyl)ether, bis(p-methyl-o-aminophenyl)benzene, bis(p-methyl-o-aminopentyl)benzene, 1,3-diamino-4-isopropylbenzene, bis(4-aminophenyl)sulfide, bis-(4-aminophenyl)sulfone, and bis(4-aminophenyl)ether. Combinations of these compounds can also be used. In some embodiments the organic diamine is m-phenylenediamine, p-phenylenediamine, sulfonyl dianiline, or a combination comprising at least one of the foregoing diamines.

Included among the many methods of making polyetherimides are those disclosed in U.S. Pat. Nos. 3,847,867, 3,852,242, 3,803,085, 3,905,942, 3,983,093, 4,443,591 and 7,041,773. These patents are mentioned for the purpose of teaching, by way of illustration, general and specific methods for preparing polyimides. Some polyetherimide (PEI) materials are described in ASTM D5205-96 Standard Classification System for Polyetherimide Materials.

Polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the polyetherimide polymer has a weight average molecular weight (Mw) of 1,000 to 150,000 grams/mole (Dalton), as measured by gel permeation chromatography, using polystyrene standards. In some embodiments the polyetherimide has Mw of 10,000 to 80,000 Daltons. Such polyetherimide polymers typically have an intrinsic viscosity greater than 0.2 deciliters per gram (dl/g), or, more specifically, 0.35 to 0.7 dl/g as measured in m-cresol at 25° C.

In an embodiment, the polyetherimide comprises less than 50 ppm amine end groups. In other instances the polymer will also have less than 1 ppm of free, unpolymerized bisphenol A (BPA).

The polyetherimides can have low levels of residual volatile species, such as residual solvent and/or water. In some embodiments, the polyetherimides have a residual volatile species concentration of less than 1,000 parts by weight per million parts by weight (ppm), or, more specifically, less than 500 ppm, or, more specifically, less than 300 ppm, or, even more specifically, less than 100 ppm. In some embodiments, the composition has a residual volatile species concentration of less than 1,000 parts by weight per million parts by weight (ppm), or, more specifically, less than 500 ppm, or, more specifically, less than 300 ppm, or, even more specifically, less than 100 ppm.

Examples of residual volatile species are halogenated aromatic compounds such as chlorobenzene, dichlorobenzene, trichlorobenzene, aprotic polar solvents such as dimethyl formamide (DMF), N-methylpyrrolidinone (NMP), dimethyl sulfoxide (DMSO), diaryl sulfones, sulfolane, pyridine, phenol, veratrole, anisole, cresols, xylenols, dichloro ethanes, tetra chloro ethanes, pyridine and mixtures thereof.

Low levels of residual volatile species in the final polymer product can be achieved by known methods, for example, by devolatilization or distillation. In some embodiments, the bulk of any solvent can be removed and any residual volatile species can be removed from the polymer product by devolatilization or distillation, optionally at reduced pressure. In other embodiments, the polymerization reaction is taken to some desired level of completion in solvent and then the polymerization is essentially completed and most remaining water is removed during a devolatilization step following the initial reaction in solution. Apparatuses to devolatilize the polymer mixture and reduce solvent and other volatile species to the low levels needed for good melt processability are generally capable of high temperature heating under vacuum with the ability to rapidly generate high surface area to facilitate removal of the volatile species. The mixing portions of such apparatuses are generally capable of supplying sufficient power to pump, agitate, and stir the high temperature, polyetherimide melt which can be very viscous. Suitable devolatilization apparatuses include, but are not limited to, wiped films evaporators, for example those made by the LUWA Company and devolatilizing extruders, especially twin screw extruders with multiple venting sections, for example those made by the Werner Pfleiderer Company or Welding Engineers.

In one embodiment, the polyetherimides include a polyetherimide thermoplastic resin composition, comprising: (a) a polyetherimide resin, and (b) a phosphorus-containing stabilizer, in an amount that is effective to increase the melt stability of the polyetherimide resin, wherein the phosphorus-containing stabilizer exhibits a low volatility such that, as measured by thermogravimetric analysis of an initial amount of a sample of the phosphorus-containing stabilizer, greater than or equal to 10 percent by weight of the initial amount of the sample remains unevaporated upon heating of the sample from room temperature to 300° C. at a heating rate of 20° C. per minute under an inert atmosphere. In one embodiment, the phosphorous-containing stabilizer has a formula $P-R'_a$, where R' is independently H, alkyl, alkoxy, aryl, aryloxy, or oxy substituent and a is 3 or 4. Examples of such suitable stabilized polyetherimides can be found in U.S. Pat. No. 6,001,957, incorporated herein in its entirety.

In some embodiments the polyetherimide has a glass transition temperature of 200 to 280° C.

It is often useful to melt filter the polyetherimide using known melt filtering techniques to remove foreign material, carbonized particles, cross-linked resin, or similar impurities. Melt filtering can occur during initial resin isolation or in a subsequent step. The polyetherimide can be melt filtered in the extrusion operation. Melt filtering can be performed using a filter with pore size sufficient to remove particles with a dimension of greater than or equal to 100 micrometers or with a pore size sufficient to remove particles with a dimension of greater than or equal to 40 micrometers.

The polyetherimide composition can optionally comprise additives such as UV absorbers, stabilizers such as light stabilizers and others, lubricants, plasticizers, pigments, dyes, colorants, anti-static agents, metal deactivators, and combinations comprising at least one of the foregoing additives. In some embodiments, the additive can include a combination of a mold release agent and a stabilizer comprising phosphite stabilizers, phosphonite stabilizers, hindered phenol stabilizers, and combinations at least one of the foregoing. In an embodiment, a phosphorus-containing stabilizer is used.

Antioxidants can be compounds such as phosphites, phosphonites, hindered phenols, or a combination comprising at least one of the foregoing antioxidants. Phosphorus-containing stabilizers including triaryl phosphites and aryl phosphonates are of note as useful additives. Difunctional phosphorus containing compounds can also be employed. In some embodiments, to prevent loss of the stabilizer during melt mixing or subsequent melt forming processes such as injection molding, the phosphorus containing stabilizers with a molecular weight greater than or equal to 300 Dalton, but less than or equal to 5,000 Dalton, are useful. The additive can comprise hindered phenols with molecular weight over 500 Dalton. Phosphorus-containing stabilizers can be present in the composition at 0.01 to 3.0% or to 1.0% by weight of the total composition.

Ultem 5000 grades polyetherimides for transformer paper are the most resistant to mineral oils, which are more aggressive in degradation of Ultem 9000 and 1000 grades. Ultem 9000 and Ultem 1000 grades show good resistance to silicone and vegetable oils.

The transformer paper further comprises fibers composed of materials other than polyetherimide. The other fibers can be high strength, heat resistant organic fibers such as aromatic polyamides (including homopolymers and copolymers) and aromatic polyester fibers (including homopolymers and copolymers). Such fibers can have a strength of about 10 g/D to about 50 g/D, specifically 15 g/D to 50 g/D, and a pyrolysis temperature of greater than 300° C., specifically greater than about 350° C. As used herein, an "aromatic" polymer contains at least 85 mole % of the polymer linkages (e.g., —CO—NH—) attached directly to two aromatic rings.

Wholly aromatic polyester fibers include liquid crystal polyesters. Illustrative examples of such wholly aromatic polyester fibers include self-condensed polymers of p-hydroxybenzoic acid, polyesters comprising repeat units derived from terephthalic acid and hydroquinone, polyester fibers comprising repeat units derived from p-hydroxybenzoic acid and 6-hydroxy-2-naphthoic acid, or combinations thereof A specific wholly aromatic liquid crystal polyester fiber is produced by the polycondensation of 4-hydroxybenzoic acid and 6-hydroxynaphthalene-2-carboxylic acid (commercially available from Kuraray Co., Ltd. under the trade name designation VECTRAN). Such wholly aromatic polyester fibers can be produced by any methods known to one skilled in the art.

Aromatic polyamide fibers are also known as aramid fibers, which can be broadly categorized as para-aramid fibers or meta-aramid fibers. Illustrative examples of para-aramid fibers include poly(p-phenylene terephthalamide) fibers (produced, e.g., by E.I. Du Pont de Nemours and Company and Du Pont-Toray Co., Ltd. under the trademark KEVLAR®), p-phenylene terephthalamide/p-phenylene 3,4'-diphenylene ether terephthalamide copolymer fibers (produced by Teijin Ltd. under the trade name TECHNORA), (produced by Teijin Ltd. under the trade name designation TWARON), or combination comprising at least one of the foregoing aramid fibers. Illustrative examples of meta-aramid fibers include poly(m-phenylene terephthalamide) fibers (produced, e.g., by E.I. Du Pont de Nemours and Company under the trademark NOMEX®). Such aramid fibers can be produced by methods known to one skilled in the art. In a specific embodiment, the aramid fibers are para-type homopolymers, for example poly (p-phenylene terephthalamide) fibers.

Aramid fibrids are a preferred ingredient in the fibrous substrate. Fibrids are typically made by streaming a polymer solution into a coagulating bath of liquid that is immiscible with the solvent of the solution. The stream of polymer solution is subjected to strenuous shearing forces and turbulence as the polymer is coagulated. The fibrid material of this invention comprises meta or para-aramid or blends thereof. More specifically, the fibrid is a para-aramid. Such aramid fibrids, before being dried, can be used wet and can be deposited as a binder physically entwined about the floc component of a paper.

In some embodiments, the resins which comprise the fibrous substrate could also be combined during a fiber extrusion process known as bi-component fiber extrusion. In such embodiments, a first polymer can be melt spun along with a second polymer to form a core/sheath fiber according to known methods. Methods for making bi-component and multicomponent fibers are well known and need not be described here in detail. For example, U.S. Pat. No. 5,227,109, which is hereby incorporated by reference, describes forming bi-component fibers in a sheath-core relationship in a spinning pack that incorporates a plurality of adjacent plates that define selected flow paths therein for a sheath component and a core component to direct the respective components into the sheath-core relationship. In addition, more complex multicomponent fiber morphologies can be considered within the term core sheath as used herein, such as disclosed in U.S. Pat. No. 5,458,972, which is hereby incorporated by reference, and describes a method of producing a multicomponent trilobal fiber using a trilobal capillary defining three legs, three apexes and an axial center, by directing a first molten polymer composition to the axial center and presenting a second molten polymer composition to at least one of the apexes. The fiber produced has a trilobal core defining an outer core surface and a sheath abutting at least about one-third of the outer core surface.

In various embodiments, the first polymer can be the core fiber while the second polymer is the sheath fiber, or the second polymer can be the core fiber while the first polymer is the sheath fiber. The first and second polymer can be any of the polymers described above in the context of the useful fibers.

In an embodiment, the liquid crystal polymer would be the core and the polyetherimide the outer layer. This embodiment would improve the uniformity of dispersion of the materials over a given area in construction of the paper. This embodiment could also allow for the production of finer fiber, which is critical for uniform dispersion in very thin products.

In one general aspect, an electrical apparatus includes a conductor and an insulation paper surrounding at least part of the conductor. The conductor of the electrical apparatus can include a winding of a transformer, with the winding being insulated by insulation paper positioned around the winding. The winding and insulation paper can be installed in an enclosure, with a dielectric fluid in the enclosure surrounding the winding and the insulation paper. The dielectric fluid can be a mineral oil, silicone oil, a natural or synthetic ester oil, or a hydrocarbon fluid.

In another general aspect, a transformer includes a core, a first winding, a second winding, and insulation paper. Each winding includes a conductor that is surrounded at least partly by insulation paper. Insulation paper is positioned between the core, the first winding, and the second winding.

In another general aspect, a method of constructing an electrical device includes providing a conductor, providing an insulation paper, and surrounding at least part of the conductor with the insulation paper.

In another general aspect, an insulated conductor includes an electrical conductor that is surrounded at least partly by an insulating paper. In some applications, the insulated conductor can be installed in a transformer.

In another general aspect, a method of making an insulated conductor includes providing a conductor, providing an insulating paper, and covering the conductor with the insulating paper.

Figure 1:
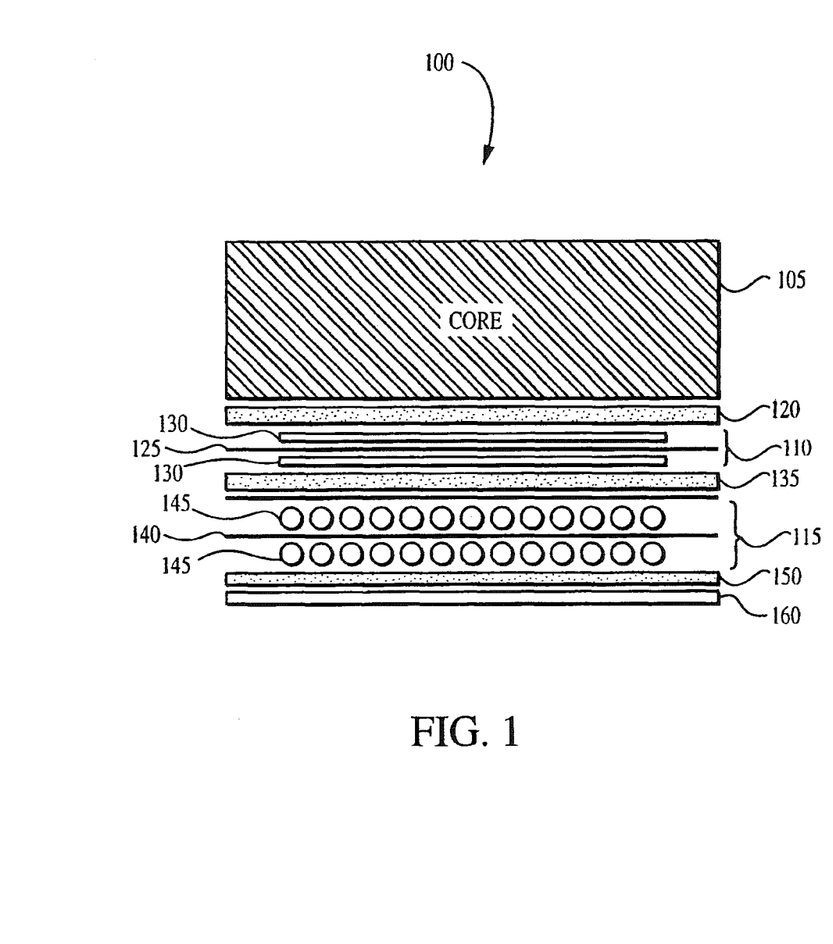
FIG. 1 is a sectional side view of an insulation structure of a transformer.

Referring to FIG. 1, an insulation structure of a transformer 100 includes a core 105, a second winding layer 110, and a first winding layer 115. A form insulation layer 120 electrically separates the core 105 from the second winding layer 110. A second insulation layer 125 separates the individual coils 130 of the second winding layer 110. A barrier insulation layer 135 separates the second winding layer 110 and the first winding layer 115. A first insulation layer 140 separates the individual coils 145 of the first layer 115. A coil wrap 150 surrounds the first layer 115 and electrically separates it from the enclosure (not shown) in which the core 105 and winding layers 110 and 115 are inserted. An optional coil-to-coil insulation layer 160 is positioned adjacent to the coil wrap 150. The layer 160 typically is made of a pressboard product and is inserted adjacent to the coil wrap 150. A dielectric fluid fills the enclosure and surrounds the core, winding layers, and insulation layers. This is a common transformer coil construction. Other coil constructions are also commonly used in the industry, depending on the type of transformer and its application. The transformer windings can be connected to make an autotransformer, and the autotransformer can be used in, for example, a voltage regulator.

The dielectric fluid in the transformer 100 can be any suitable dielectric fluid, such as mineral oil, R-temp, Envirotemp FR-3, Envirotemp 200, Edisol TR, and silicone oil. Mineral oil and silicone oil are commonly available from a variety of distributors. R-temp is the brand name of a high molecular weight hydrocarbon fluid. Envirotemp FR-3 is the brand name of a natural ester fluid, commonly identified as vegetable oil based. Envirotemp 200 is the brand name of a synthetic ester fluid. Edisol TR is the brand name of a synthetic hydrocarbon fluid. R-temp, Envirotemp FR-3, Envirotemp 200, and Edisol TR are all available from Cooper Power Systems of Waukesha, Wis.

The insulating layers in the transformer are consolidated fibrous mats containing polyetherimide fibers. The individual conductors in the transformer can also be wrapped with the same insulation paper.

The electrical insulation paper can be made using known paper making techniques, such as on cylinder or fourdrinier paper making machines. In general, fibers are chopped and refined to obtain the proper fiber size. The synthetic fibers and binder are added to water to form a mixture of fibers and water.

The mixture then is screened to drain the water from the mixture to form a sheet of paper. The screen tends to orient the fibers in the direction in which the sheet is moving, which is referred to as the machine direction. Consequently, the resulting insulation paper has a greater tensile strength in the machine direction than in the perpendicular direction, which is referred to as the cross direction. The sheet of paper is fed from the screen onto rollers and through other processing equipment that removes the water in the paper.

The fibrous substrate can be prepared in various aereal densities known in the art, generally 5 to 200 GSM. In one aspect the consolidated fibrous substrate has a density of 80 grams per square meter, or 80 GSM.

The transformer paper generally has a porosity sufficient to be permeable to the transformer oil and allows transformer oil to circulate through and conduct gases out of the consolidated product. In an aspect, the porosity is 0 to 90% by volume. Methods of measuring porosity are known to those skilled in the art, such as ISO 5636-5:2003. In this technique, the Gurley second or Gurley unit is a unit describing the number of seconds required for 100 cubic centimeters (1 deciliter) of air to pass through 1.0 square inch of a given material at a pressure differential of 4.88 inches of water (0.188 psi), which can be expressed as square inch seconds per deciliter ($s \cdot in^2/dl$). In SI units, 1 $s \cdot in^2/dl$=6.4516 seconds per meter column of air (s/m). In another aspect, the transformer paper has a porosity of greater than 0 to less than 120 $s \cdot in^2/dl$ (Gurley second).

The transformer paper can have an electrical breakdown strength of 400 Volt/mil, for example 450, 500, 550, 600, 650, 700, 750, 800, 850, 900, 950, or greater than 1000 Volt/mil.

Other types of insulating paper can be made using the compositions described above. For example, an insulating paper using the compositions can be formed as crepe paper. In general, crepe paper is formed in the same manner as the insulation paper described above. The paper is slightly moistened and passed from a payout roll to a pickup roll. The pickup roll turns at a slightly slower speed than the payout roll such that the paper backs up in the area between the rolls and is slightly crimped. The crepe paper formed in this manner can be used as insulation, for example, to insulate coil leads or internal transformer wires. The crepe paper can be used over bare conductors and over conductors that are already overcoated with an insulation material. The crepe paper also can be used to supplement regular paper in some coil designs, such as in the function of a high-low barrier insulation. Due to the flexibility of crepe paper, it can be wrapped around the various conductors, coil leads, and wires that are used in a transformer or reactor.

Pressboard, a compressed pulp product, is another example of an insulating paper that can be formed using the compositions described above. Pressboard products used in, for example, transformers, typically have a thickness of between 30 mils and 250 mils. Pressboard is used to provide a dielectric and a mechanical support function. Because pressboard is rigid, it typically is not wrapped around a conductor, as is the case with the more flexible crepe paper and insulation paper described above. Nonetheless, pressboard can be shaped to conform to some of the various configurations of a transformer. For example, it can be shaped to fit inside a coil window of a transformer or to be placed between the core and coils of a transformer.

Techniques for making pressboard are well known in the paper making industry. Typically, the mixture of binder and fibers is mixed with water and conveyed to a wide, rotary cylindrical screen. The water flows through the screen and the fibers are filtered out onto the screen surface to form a paper web layer. A felt layer removes the paper web layer from the screen and conveys the layer to a forming roll. The layer then is wet laminated to form the required thickness by the continuous winding of the paper layer onto the forming roll. Once it is wound on the forming roll, the material is pressed in a pressing operation until the material contains approximately 55% water. The material then is dried under heat with the pressure removed until the material contains approximately 5% water. The material then is further compressed using heavy calenders to give a thickness of the product that is in the range, for example, of between approximately 30 mils to 250 mils, depending upon the desired application. In one embodiment, the paper web layer is preheated prior to consolidation, e.g., prior to calendaring.

Molded articles can also be made using the fibrous substrates provided by the invention. For example, where non-conductive parts of larger dimensions are required, the fibrous substrate can be compression molded to the desired shape.

Figure 2:
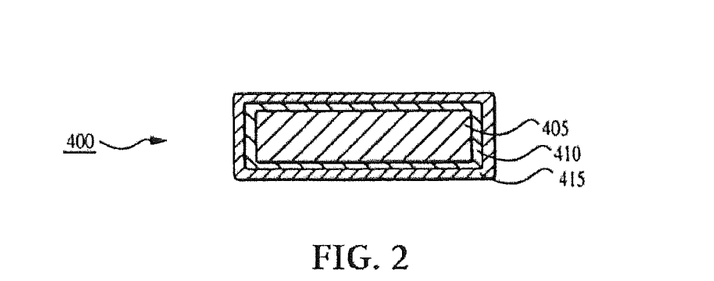
FIG. 2 is a sectional front view of a rectangular wire conductor.
Figure 3:
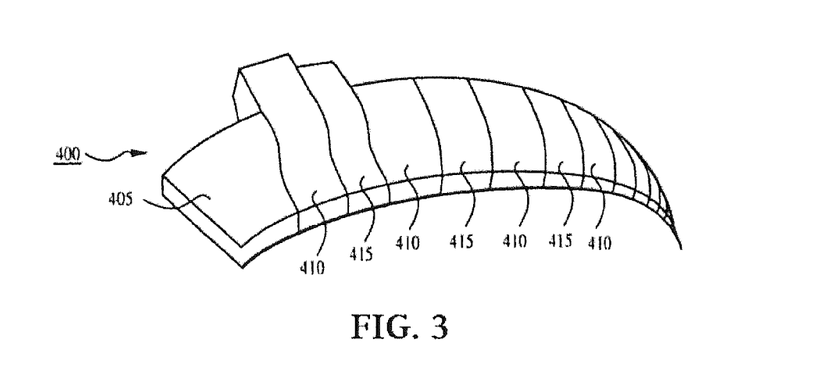
FIG. 3 is a perspective view of the conductor of FIG. 2.

The insulation paper also can be used in numerous applications in which insulation paper is commonly used, such as the insulation paper used in paper-covered conductors. One type of paper-covered conductor is the rectangular wire used in larger transformers. These wires are wrapped with insulation paper. For example, referring to FIGS. 2 and 3, a conductor 400 includes a rectangular wire 405 that is loosely wrapped with a pair of continuous strips of insulation paper 410 and 415 such that they overlap. The insulation paper 410 and 415 can be the insulation paper described above or crepe paper. It also can be shaped pressboard.

Figure 4:
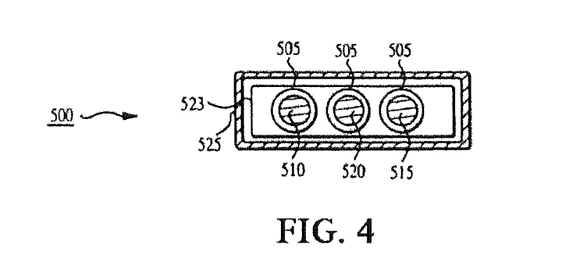
FIG. 4 is a sectional front view of a three-wire conductor.
Figure 5:
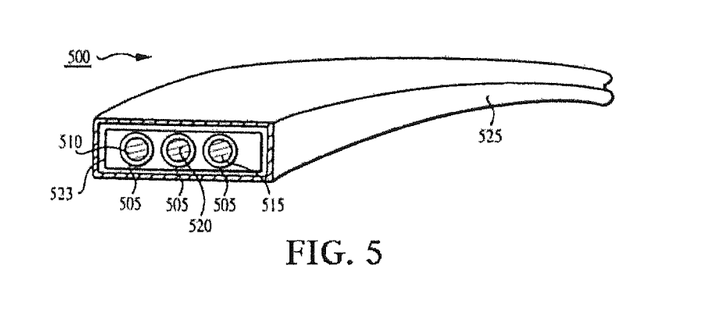
FIG. 5 is a perspective view of the conductor of FIG. 4.

Referring to FIGS. 4 and 5, another type of paper-covered conductor is common heavy gauge house wiring 500, which has layers of plastic or rubber insulation 505 surrounding the common 510 and live 515 wires. The ground wire 520, which is positioned between the common wire 510 and the live wire 515, optionally is covered by insulation material, as illustrated in FIGS. 4 and 5. The insulation and wires are overcoated with a layer of insulation paper 523, which is overcoated by a plastic or rubber insulation layer 525.

EXAMPLES

Materials

The following materials were used:

| Material | Trade Name | Source |
| --- | --- | --- |
| Polyetherimide A | Ultem 5001 | SABIC Innovative Plastics |
| Polyetherimide B | Ultem 9011 | SABIC Innovative Plastics |
| Mineral Oil | Nytro 11 GBX | Nynas USA, Inc |
| Vegetable Oil (FR3) | Envirotemp FR3 | Cargill |
| Silicone Oil | Xiameter 561 | Dow Corning Corporation |

Oil Compatibility Test

Oil compatibility tests were run on two types of polyetherimide films ranging between 25-35 μm in thickness. The effect of oil type and oil temperature on thickness, glass transition temperature, stress, and strain of the films were studied as outlined below.

Swelling is a concern for transformer insulating materials. Cellulose materials enjoy a strong chemical dissimilarity from mineral oils, with mineral oils being non-polar, hydrophobic, naphthenic materials. In contrast, cellulose is composed of hydrophilic structural components that have polar hydroxyl substituents. Hence, there is little risk of swelling due to chemical dissimilarity. Most synthetic polymers are non-polar and hydrophobic. Accordingly, there exists the risk of swelling, caused by diffusion of the transformer oil molecules into the polymers that make up the solid insulation.

To test this, 12 sample films of Ultem 5001 (identified as Polyetherimide A) and 10 sample films of Ultem 9011 (identified as Polyetherimide B) were exposed to the three candidate transformer oils at 120° C., and were analyzed weekly for a period of 8 weeks. No attempt was made to regulate the moisture level, and the samples were loosely covered but exposed to air. Film thickness was measured using a Filmetrics thin film analyzer. The results of this test are shown in Table 1, which presents swelling data (via direct film thickness) as the average of 12 runs for two grades of polyetherimide film in three different oils.

TABLE 1

| Weeks@ 120° C. | PEI A in Mineral Oil (μm) | PEI A in Silicone Oil (μm) | PEI A in Vegetable Oil (μm) | PEI B in Mineral Oil (μm) | PEI B in Silicone Oil (μm) | PEI B in Vegetable Oil (μm) |
| --- | --- | --- | --- | --- | --- | --- |
| 0 | 29.26 | 29.48 | 27.96 | 29.33 | 30.43 | 29.86 |
| 1 | 29.48 | 29.34 | 27.96 | 27.69 | 30.26 | 30.42 |
| 2 | 29.80 | 29.37 | 28.05 | 30.73 | 30.90 | 29.33 |
| 3 | 29.53 | 29.63 | 27.94 | 31.13 | 30.31 | 29.75 |
| 4 | 29.58 | 29.55 | 28.24 | 30.33 | 30.42 | 30.30 |
| 5 | 29.82 | 29.47 | 28.13 | 30.66 | 30.31 | 30.34 |
| 6 | 29.61 | 29.37 | 27.97 | 32.03 | 29.95 | 30.97 |
| 7 | 29.53 | 29.37 | 28.11 | 32.28 | 30.18 | 29.80 |
| 8 | 29.32 | 29.64 | 28.29 | 30.17 | 29.48 | 30.21 |

The data show surprisingly good dimensional stability over the course of the accelerated aging study. The Polyetherimide B (Ultem 9011) in mineral oil experienced minor swelling of about 1% after an equivalent of over 40 years life. This test suggests that for optimum safety, if mineral oil is to be used, the solvent-resistant Polyetherimide A (Ultem 5001) is the best choice.

To further investigate swelling, Differential Scanning calorimetry (DSC) measurements were performed, and the results are displayed in Table 2. It was anticipated that if transformer oil were swelling the candidates polymers, that the $T_g$ would change. This result is surprising, especially in light of the previously discussed swelling via direct measurement. This data spans an equivalent paper thermal aging of nearly 50 years (8 weeks at 120° C.). Over that accelerated testing timeframe, these results show minimal change in $T_g$ and suggest that both films are suitable for use with any of the transformer oils studied.

TABLE 2

| Weeks Immersed in Oil @ 120 C. | PEI A in Mineral Oil (° C.) | PEI A in Silicone Oil (° C.) | PEI A in Veggie FR3 Oil (° C.) | PEI B in Mineral Oil (° C.) | PEI B in Silicone Oil (° C.) | PEI B in Veggie FR3 Oil (° C.) |
| --- | --- | --- | --- | --- | --- | --- |
| 0 | 226 | 226 | 226 | 215 | 215 | 215 |
| 0 | 226 | 226 | 226 | 216 | 216 | 216 |
| 1 | 225 | 225 | 224 | 216 | 215 | 214 |
| 1 | 225 | 226 | 223 | 216 | 216 | 215 |
| 2 | 226 | 226 | 226 | 214 | 216 | 215 |
| 2 | 225 | 226 | 227 | 216 | 216 | 216 |
| 4 | 225 | 226 | 225 | 216 | 216 | 216 |
| 4 | 224 | 226 | 225 | 216 | 216 | 215 |
| 8 | 224 | 226 | 223 | 215 | 216 | 214 |
| 8 | 224 | 225 | 222 | 216 | 216 | 214 |

Mechanical Properties: In transformer operation, mechanical strength (to resist short-circuit forces) is a desirable property, and "life" during accelerated aging of cellulose papers is often measured in terms of retention of mechanical properties such as tensile strength. To investigate this, $T_g$ via tensile dynamic mechanical analysis (tensile DMA) was performed. In this test, the $T_g$ was determined by the position of the peak of the loss modulus rather than the more traditional determination as the peak of the tan delta curve due to sample failure above the loss modulus maxima. The results are shown in Table 3, below.

TABLE 3

| Weeks Immersed in Oil @120° C. | PEI A in Mineral Oil (° C.) | PEI A in Silicone Oil (° C.) | PEI A in Veggie FR3 Oil (° C.) | PEI B in Mineral Oil (° C.) | PEI B in Silicone Oil (° C.) | PEI B in Veggie FR3 Oil (° C.) |
| --- | --- | --- | --- | --- | --- | --- |
| 0 | 214 | 214 | 214 | 204 | 204 | 204 |
| 8 | 212 | 212 | 210 | 202 | 202 | 201 |

Shown are the values (determined via 10 μm amplitude DMA) for virgin polyetherimide and after 8 weeks aging at 120° C. (~50 years equivalent life). Within the confidence of the determined values, the $T_g$ of the material (determined via tensile DMA) is unchanged for either the Polyetherimide A or the Polyetherimide B material.

Stress Strain measurements were conducted according to ASTM D882.

The yield stress of the material was obtained from Stress-Strain curves (as indicated by the onset of the plateau, and logged at 5% strain). This family of curves shows the natural variation in the data. ASTM D882 generally reports precision of +/−10% in yield stress data for polymer films based on 5 replicates, in this case two replicates were used in the averages.

These plateau values (at 5% strain) are then plotted for both Polyetherimide A and Polyetherimide B materials, as a function of aging duration in mineral oil. Only mineral oil was tested because it was expected to be the most aggressive toward the polymer films. The results of this test are summarized in Table 4, below.

TABLE 4

| Weeks Immersed in Oil @ 120° C. | PEI A in Mineral Oil (MPa) | PEI B in Mineral Oil (MPa) |
| --- | --- | --- |
| 0 | 67.0 | 70.0 |
| 0 | 67.0 | 84.0 |
| 2 | 72.0 | 73.0 |
| 2 | 74.0 | 75.0 |
| 4 | 74.0 | 85.0 |
| 4 | 74.0 | 85.0 |
| 8 | 65.0 | 83.0 |
| 8 | 66.0 | 76.0 |

As shown in Table 4, the Polyetherimide A and Polyetherimide B materials displayed relatively consistent performance in terms of property retention through 4 weeks of immersion in mineral oil at 120° C. By 8 weeks, the performance degraded more in both cases, but the Stress Strain plateaus remained above 60 MPa.

The terms "a" and "an" do not denote a limitation of quantity, but rather denote the presence of at least one of the referenced item.

The term "or" means "and/or."

Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

In general, the compositions or methods may alternatively comprise, consist of, or consist essentially of, any appropriate components or steps herein disclosed. The invention may additionally, or alternatively, be formulated so as to be devoid, or substantially free, of any components, materials, ingredients, adjuvants, or species, or steps used in the prior art compositions or that are otherwise not necessary to the achievement of the function and/or objectives of the present claims.

"Optional" or "optionally" means that the subsequently described event or circumstance may or may not occur, and that the description includes instances where the event occurs and instances where it does not.

The modifier "about" used in connection with a quantity is inclusive of the stated value and has the meaning dictated by the context (e.g., includes the degree of error associated with measurement of the particular quantity).

The notation "±10%" means that the indicated measurement may be from an amount that is minus 10% to an amount that is plus 10% of the stated value.

The endpoints of all ranges directed to the same component or property are inclusive of the endpoints, are independently combinable, and include all intermediate points and ranges optional: (e.g., ranges of "up to about 25 wt. %, or, more specifically, about 5 wt. % to about 20 wt. %," is inclusive of the endpoints and all intermediate values of the ranges of "about 5 wt. % to about 25 wt. %," such as about 10 wt. % to about 23 wt. %, etc.).

The suffix "(s)" as used herein is intended to include both the singular and the plural of the term that it modifies, thereby including one or more of that term (e.g., the colorant(s) includes one or more colorants).

The terms "first," "second," and the like, "primary," "secondary," and the like, as used herein do not denote any order, quantity, or importance, but rather are used to distinguish one element from another.

The terms "front," "back," "bottom," and/or "top" are used herein, unless otherwise noted, merely for convenience of description, and are not limited to any one position or spatial orientation.

The term "combination" is inclusive of blends, mixtures, alloys, reaction products, and the like.

Unless defined otherwise, technical and scientific terms used herein have the same meaning as is commonly understood by one of skill in the art to which this invention belongs.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

The invention includes at least the following embodiments.

Embodiment 1

A transformer paper comprising a consolidated product of a fiber composition, the fiber composition comprising, based on the total weight of fibers in the fiber composition: 35 to 70 weight % of polyetherimide homopolymer fiber, polyetherimide copolymer fiber, or a combination of the foregoing; at least 5 weight % of binder fibers comprising aromatic polyamide fibrids, aromatic polyamide fibers, or a combination comprising at least one of the foregoing; and 5 to 30 weight % of liquid crystal polymer fiber, wherein the binder fibers comprise less than 10 weight % of a polycarbonate.

Embodiment 2

The transformer paper of Embodiment 1, wherein the polyimide retains at least 90% of its molecular weight upon exposure to silicone, vegetable, or mineral oil at a temperature of 150 to 200° C.

Embodiment 3

The transformer paper of Embodiment 1, wherein the polyimide retains at least 90% of its molecular weight upon exposure to silicone, vegetable, or mineral oil at a temperature of 180° C.

Embodiment 4

The transformer paper of claim 1, wherein the consolidated product has a resistivity of at least 1000 MOhm-cm; an electrical breakdown strength of at least 600 Volt/mil; a thermal capability exceeding the standards for NEMA Class F (155° C.) and NEMA Class H (180° C.); a tear strength, measured as Elmendorf tear strength of at least 85 mN; and a thickness of more than 0 to less than 100 millimeters.

Embodiment 5

The transformer paper of Embodiment 1, wherein the consolidated product has a porosity sufficient to allow transformer oil to circulate through and conduct gases out of the consolidated product.

Embodiment 6

The transformer paper of Embodiment 5, wherein the porosity is 10 to 90% by volume.

Embodiment 7

The transformer paper of Embodiment 1, wherein the polyetherimide comprises structural units of the formula wherein in the foregoing formulas, n is greater than 1, R is an aromatic hydrocarbon group having 6 to 20 carbon atoms, a halogenated derivative thereof, a straight or branched chain alkylene group having 2 to 10 carbon atoms, a cycloalkylene group having 3 to 20 carbon atoms, or a divalent group of the formula wherein $Q^1$ is a bond, —O—, —S—, —C(O)—, —SO2-, —SO—, and —$C_yH_{2y}$— and a halogenated derivative thereof wherein y is 1 to 5; and $Z^1$ is each independently an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing.

Embodiment 8

The transformer paper of Embodiment 6, wherein $Z^1$ is a divalent group of formula wherein $Q^a$ is each independently a single bond, —O—, —S—, —C(O)—, —$SO_2$—, —SO—, and —$C_yH_{2y}$— and a halogenated derivative thereof wherein y is an integer from 1 to 5, and R is a divalent group of the formula and a combination comprising at least one of the foregoing, wherein $Q^1$ is a single bond, —O—, —S—, —C(O)—, —$SO_2$—, —SO—, —$C_yH_{2y}$— or a halogenated derivative thereof wherein y is an integer from 1 to 5.

Embodiment 9

The transformer paper of Embodiment 8, wherein Z is 2,2-(4-phenylene)isopropylidene and R is m-phenylene, p-phenylene diarylsulfone, or a combination comprising at least one of the foregoing.

Embodiment 10

The transformer paper of Embodiment 1, wherein the aromatic polyamide is poly(p-phenylene terephthalamide), poly (p-phenylene terephthalimide-co-3'4'-oxydiphenylene terephthalimide), or combination comprising at least one of the foregoing aromatic polyamides.

Embodiment 11

The transformer paper of Embodiment 1, wherein the liquid crystal polymer is poly(4-hydroxybenzoic acid-co-6-hydroxy-2-napthoic acid).

Embodiment 12

A method of forming the transformer paper of Embodiment 1, comprising forming a layer from a slurry comprising a suspension solvent; and a fiber composition comprising a combination of 35 to 70 wt. % of polyetherimide fibers; at least 5 wt. % of aromatic polyamide fibers; and 5 to 30 wt. % of liquid crystal polymer fibers, wherein the wt. % of the fibers is based on the total weight of the fibers in the fiber composition; dewatering the layer; and consolidating the layer to form the fibrous substrate.

Embodiment 13

The method of Embodiment 12, wherein the consolidating is conducted on a static press.

Embodiment 14

The method of Embodiment 12, wherein the layer is exposed to subatmospheric pressure during at least a portion of the process.

Embodiment 15

The method of Embodiment 12, wherein the consolidating is conducted in a continuous roll press.

Embodiment 16

A transformer component comprising the transformer paper of Embodiment 1.

Embodiment 17

The transformer component of Embodiment 16, wherein the component is a porous paper, nonporous paper, creped paper, stick paper, spacer, pressboard, or a rigid structure.

Embodiment 18

The transformer component of Embodiment 16 having a porosity of greater than 0 to less than 120 s·in$^2$/dl.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A transformer paper comprising a consolidated product of a fiber composition, the fiber composition comprising, based on the total weight of fibers in the fiber composition:
   35 to 70 weight % of polyetherimide homopolymer fiber, polyetherimide copolymer fiber, or a combination of the foregoing;
   at least 5 weight % of binder fibers comprising aromatic polyamide fibrids, aromatic polyamide fibers, or a combination comprising at least one of the foregoing; and
   5 to 30 weight % of liquid crystal polymer fiber,
   wherein the binder fibers comprise less than 10 weight % of a polycarbonate.

2. The transformer paper of claim 1, wherein the polyimide retains at least 90% of its molecular weight upon exposure to silicone, vegetable or mineral oil at a temperature of 150 to 200° C.

3. The transformer paper of claim 1, wherein the polyimide retains at least 90% of its molecular weight upon exposure to silicone, vegetable, or mineral oil at a temperature of 180° C.

4. The transformer paper of claim 1, wherein the consolidated product has
   a resistivity of at least 1000 MOhm-cm;
   an electrical breakdown strength of at least 600 Volt/mil;
   a thermal capability exceeding the standards for NEMA Class F (155° C.) and NEMA Class H (180° C.);
   a tear strength, measured as Elmendorf tear strength of at least 85 mN; and
   a thickness of more than 0 to less than 100 millimeters.

5. The transformer paper of claim 1, wherein the consolidated product has a porosity sufficient to allow transformer oil to circulate through and conduct gases out of the consolidated product.

6. The transformer paper of claim 5, wherein the porosity is 10 to 90% by volume.

7. The transformer paper of claim 1, wherein the polyetherimide comprises structural units of the formula wherein in the foregoing formulas,
n is greater than 1,
R is an aromatic hydrocarbon group having 6 to 20 carbon atoms, a halogenated derivative thereof, a straight or branched chain alkylene group having 2 to 10 carbon atoms, a cycloalkylene group having 3 to 20 carbon atoms, or a divalent group of the formula wherein $Q^1$ is a bond, —O—, —S—, —C(O)—, —SO2-, —SO—, and —C$_y$H$_{2y}$— and a halogenated derivative thereof wherein y is 1 to 5; and
$Z^1$ is each independently an aromatic C$_{6-24}$ monocyclic or polycyclic moiety optionally substituted with 1 to 6 C$_{1-8}$ alkyl groups, 1 to 8 halogen atoms, or a combination comprising at least one of the foregoing.

8. The transformer paper of claim 7, wherein $Z^1$ is a divalent group of formula wherein $Q^a$ is each independently a single bond, —O—, —S—, —C(O)—, —SO$_2$—, —SO—, and —C$_y$H$_{2y}$— and a halogenated derivative thereof wherein y is an integer from 1 to 5, and R is a divalent group of the formula and a combination comprising at least one of the foregoing, wherein $Q^1$ is a single bond, —O—, —S—, —C(O)—, —SO$_2$—, —SO—, —C$_y$H$_{2y}$— or a halogenated derivative thereof wherein y is an integer from 1 to 5.

9. The transformer paper of claim 7, wherein Z is 2,2-(4-phenylene)isopropylidene and R is m-phenylene, p-phenylene diarylsulfone, or a combination comprising at least one of the foregoing.

10. The transformer paper of claim 1, wherein the aromatic polyamide is poly(p-phenylene terephthalamide), poly(p-phenylene terephthalimide-co-3'4'-oxydiphenylene terephthalimide), or a combination comprising at least one of the foregoing aromatic polyamides.

11. The transformer paper of claim 1, wherein the liquid crystal polymer is poly(4-hydroxybenzoic acid-co-6-hydroxy-2-napthoic acid).

12. A method of forming the transformer paper of claim 1, comprising
    forming a layer from a slurry comprising
        a suspension solvent; and
        a fiber composition comprising a combination of
            35 to 70 wt. % of polyetherimide fibers;
            at least 5 wt. % of aromatic polyamide fibers; and
            5 to 30 wt. % of liquid crystal polymer fibers,
            wherein the wt. % of the fibers is based on the total weight of the fibers in the fiber composition;
    dewatering the layer; and
    consolidating the layer to form the fibrous substrate.

13. The method of claim 12, wherein the consolidating is conducted on a static press.

14. The method of claim 12, wherein the layer is exposed to subatmospheric pressure during at least a portion of the process.

15. The method of claim 12, wherein the consolidating is conducted in a continuous roll press.

16. A transformer component comprising the transformer paper of claim 1.

17. The transformer component of claim 16, wherein the component is a porous paper, nonporous paper, creped paper, stick paper, spacer, pressboard, or a rigid structure.

18. The transformer component of claim 16 having a porosity of greater than 0 to less than 120 s·in$^2$/dl.

* * * * *